Dec. 28, 1943.  S. N. ARNOLD  2,337,538
WRENCH
Filed March 30, 1942   2 Sheets-Sheet 1

INVENTOR
STANFIELD N. ARNOLD
BY
ATTORNEY

Dec. 28, 1943.  S. N. ARNOLD  2,337,538
WRENCH
Filed March 30, 1942   2 Sheets-Sheet 2

INVENTOR
STANFIELD N. ARNOLD.
BY
ATTORNEY

Patented Dec. 28, 1943

2,337,538

UNITED STATES PATENT OFFICE 2,337,538

WRENCH

Stanfield N. Arnold, Brooklyn, N. Y., assignor to Foster Wheeler Corporation, New York, N. Y., a corporation of New York Application March 30, 1942, Serial No. 436,826

8 Claims. (Cl. 81—90)

This invention relates to wrenches and more particularly to a wrench for use in tightening or loosening conduit joints.

The invention provides a wrench which is adapted to turn easily the connecting member of a conduit joint comprising a revoluble member by means of which the opposing members of the joint are connected or disconnected. The wrench of the present invention is particularly adapted for use when the joint is so located that the space within which the wrench may be used is limited or the joint is so positioned that it is not easily accessible.

The invention will be understood from the following description when considered in connection with the accompanying drawings forming a part thereof, and in which.

Like characters of reference refer to like parts throughout the several views.

Figure 1:
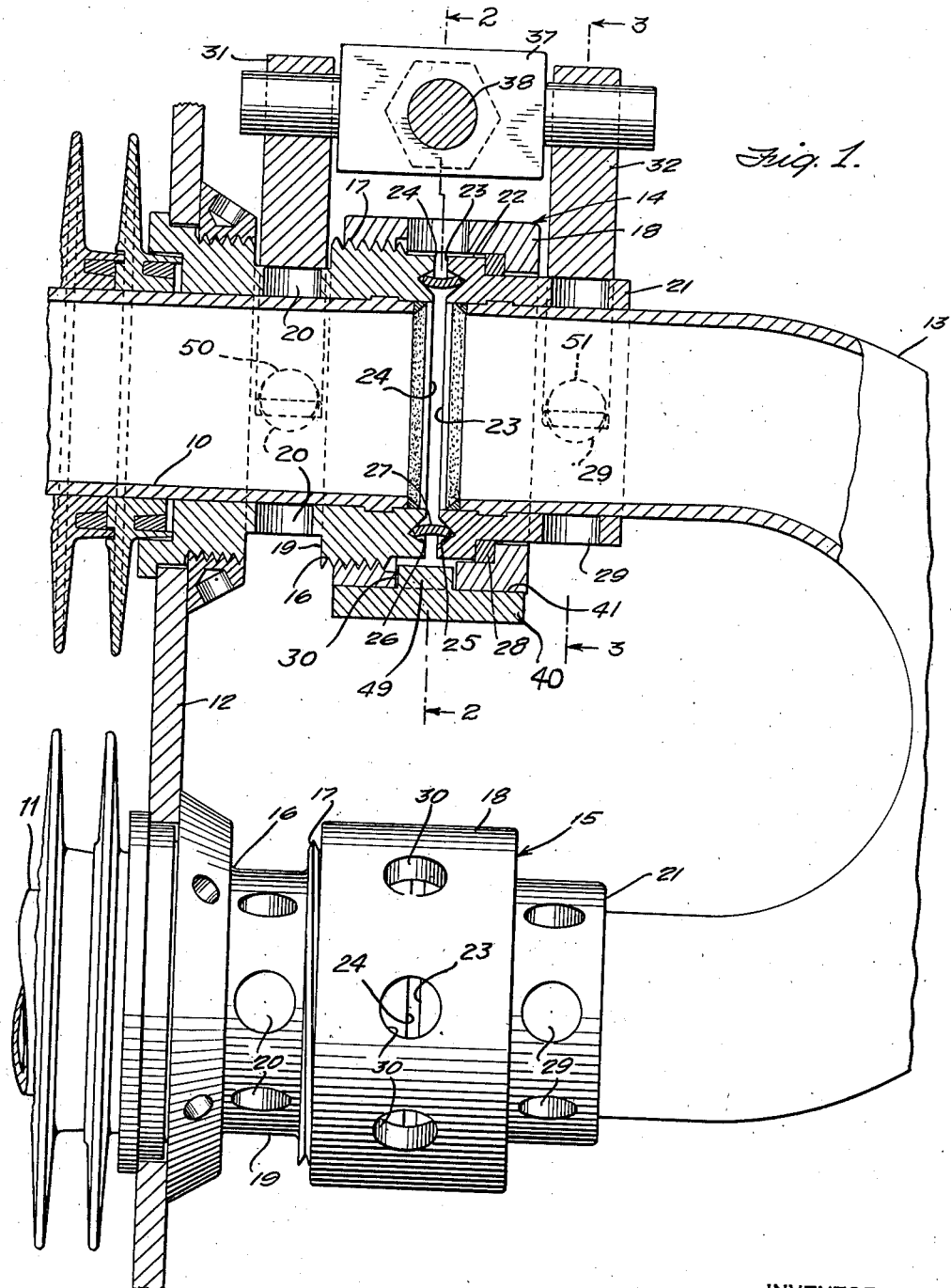
Fig. 1 is a side elevational view of two conduits of a heat transfer apparatus connected by a U-bend connection the wrench of the present invention being shown in longitudinal section in position on a joint between the U-bend connection and one of the conduits.

The wrench of the present invention will be described as used in conjunction with a joint disclosed in my copending application, Serial No. 436,825, filed March 30, 1942, which joint will be disclosed herein as used to join conduits of heat exchange apparatus and a U-bend connection.

Referring to the drawings, the reference numeral 10 designates one conduit of a heat transfer device, while another conduit is designated by the numeral 11. Both conduits are mounted in a wall 12 and project outwardly thereof. The conduits are connected at their projecting end by a U-bend connection 13, a joint 14 connecting the conduit 10 with the U-bend connection while a similar joint 15 connects the conduits 11 with the other end of said connection.

The outwardly projecting end of each of the conduits 10 and 11 has a hub 16 secured thereto by expanding the conduit thereinto, by welding or by any other desirable means. The hubs 16 extend slightly beyond the end of said conduits and are screw-threaded at 17 to receive an annular union-sleeve nut 18. The hubs 16 have a portion 19 thereof intermediate their opposite ends which is of slightly less diameter than the remainder of the hub. The portion 19 has a plurality of apertures 20 therein.

The opposite ends of the U-bend connection 13 each save a hub 21 of substantially the same diameter as the portion 19 of the hub 16 secured thereto by expanding the U-bend connection thereinto, by welding, or any other desirable means. The hubs 21 have an annular flange 22 on the end thereof adjacent the end of the U-bend connection 13, and have an annular row of spaced apertures 29 of substantially the same diameter as the apertures 20 adjacent the end thereof opposite to the flanged end. The flange 22 is of substantially the same diameter as the end portion of the hubs 16 adjacent the end of the conduits 10 and 11, said flange extending slightly beyond the ends of the connection 13. The flanges 22 have an inner face 23 which is opposed to the inner face 24 on the end of the hubs 16. The opposing faces 23 and 24 respectively have annular grooves 25 and 26 therein which are substantially V-shaped. An annular sealing gasket or ring 27 is adapted to be positioned between the faces 23 and 24, the opposite sides of the gasket engaging respectively the grooves 25 and 26.

The union-sleeve nuts 18 are adapted to tighten the joints between the U-bend connection 13 and the conduits 10 and 11 by drawing the faces 23 and 24 of the opposing hubs 21 and 16 toward one another. The nuts 18 are recessed to fit over the hub 16 the recess being screw-threaded to engage the screw threads 17. A friction ring 28 is interposed between the flange 22 and the bottom of the recess in the nut. The joints 14 and 15 are tightened and the conduits 10 and 11 connected through the connection 13 by turning the nuts 18 in one direction on the threads 17, the ring 27 and grooves 25 and 26 being maintained in engagement thereby. The joints are loosened and the conduits 10 and 11 disconnected by turning the nuts in the opposite direction. In order that the nuts 18 may be turned, an annular row of spaced apertures 30 are provided which apertures are adapted to receive a wrench.

The wrench of the present invention, which is particularly adapted to turn the union-sleeve nuts 18, comprises spaced straps 31 and 32. The straps respectively have inner surfaces 33 and 34 of substantially the same radius as the peripheries of the hub 21 and the portion 19 of the hub 16 and are of a substantially semi-circular shape, the surfaces 33 and 34 being adapted to engage slightly less than 180° of the surface of the peripheries of the hubs. Projections 35 and 36 extend outwardly from the outer surface of the straps 31 and 32 respectively at a point substantially intermediate the opposite ends of the straps. The straps 31 and 32 are held in spaced relationship by means of a trunnion 37 pivotally mounted at opposite ends thereof in the projections 35 and 36. The trunnion 37 has a bore therethrough adapted to receive a bolt 38 one end of which has threads 39 thereon the bore being slightly larger in diameter than the bolt so that the bolt may be readily turned.

An intermediate strap member 40 substantially semi-circular in shape and of a width less than the distance between the straps 31 and 32, has an inner surface 41 adapted to engage the periphery of the union-sleeve nut 18 for slightly less than 180° of the surface thereof. The surface 41 is curved oppositely to the surfaces 33 and 34 of the straps 31 and 32 respectively and engages that portion of the surface of the nut 18 diametrically opposite to the surface of the hub 21 engaged by the surface 34 of the strap 32 and the portion 19 of the hub 16 engaged by the surface 33 of the strap 31. The intermediate strap member 40 has spaced extensions 42 and 43 extending outwardly therefrom at the opposite side edges thereof and adjacent one end of the strap member. The extensions 42 and 43 respectively have slots 44 and 45 therein which are in horizontal alignment and adapted to receive the opposite arms 46 and 47 of a trunnion nut 48 so that the trunnion nut may be pivotally mounted therein. A pin 49 of a diameter slightly less than the diameter of the apertures 30 projects inwardly from the surface 41 of the member 40 and is adapted to project into one of said apertures and hold the member 40 and nut 18 against relative movement. Similar pins 50 and 51 project inwardly respectively from the surfaces 33 and 34 of the straps 31 and 32 and are adapted to project into apertures 20 and 29 to hold the straps against movement in relation to the hub on which it is positioned.

Figure 3:
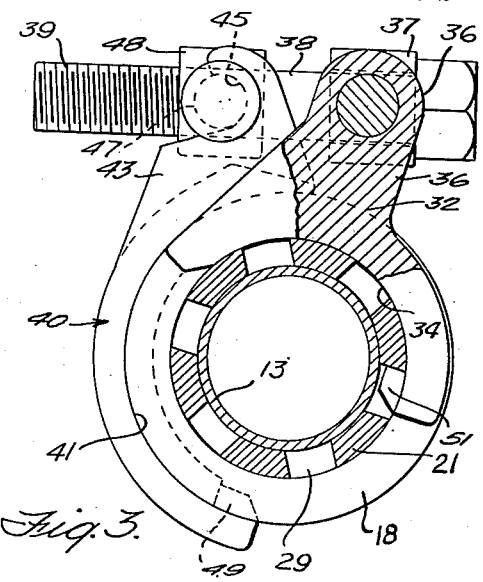
Fig. 3 is a view similar to Fig. 2 but taken on the line 3—3 of Fig. 1.
Figure 4:
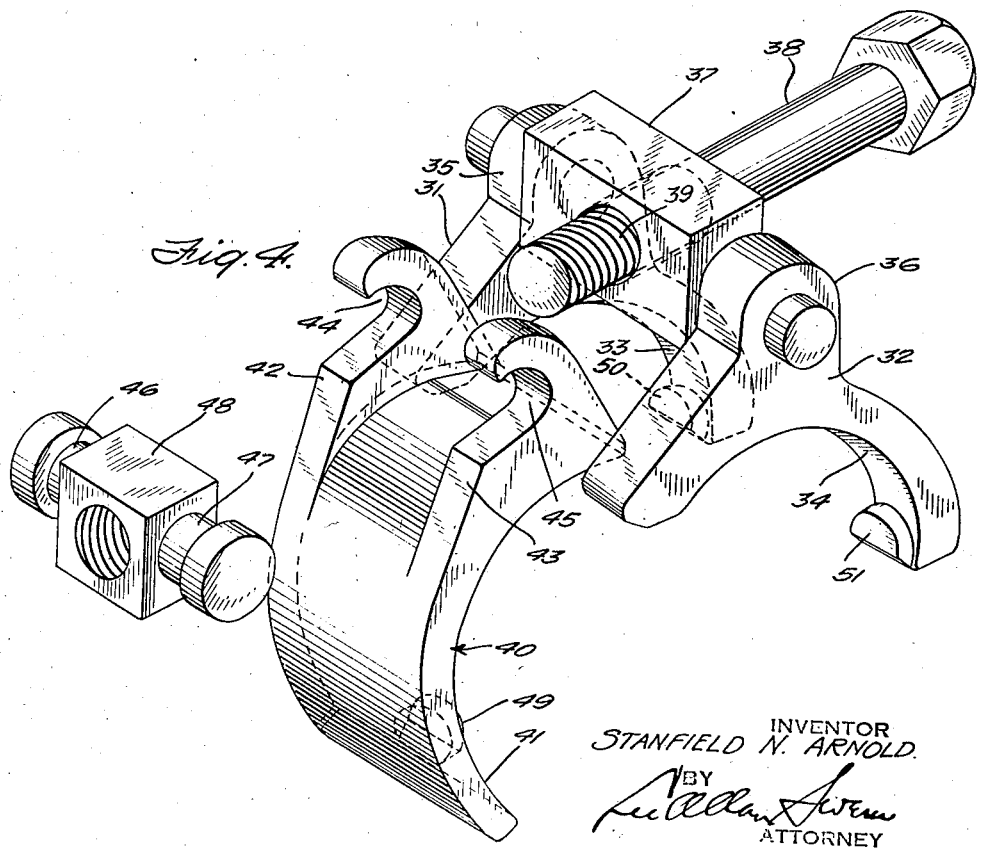
Fig. 4 is a perspective view of the wrench of the present invention exploded to show the various parts prior to positioning the wrench on a joint.

For the purpose of describing the operation of the wrench of the present invention, it will be assumed that the union-sleeve nut 18 is turned in a clockwise direction to tighten the joints 14 and 15 and in a counter-clockwise direction to loosen the joints. When it is desired turn the nut 18 so as to tighten one of the joints, the straps 31 and 32 are positioned on the right hand side of the hubs 16 and 21, as shown in Fig. 3, the inner surface 33 of the strap 31 engaging the periphery of the portion 19 of the hub 16 and the pin 50 engaging one of the apertures 20 while the inner surface 34 of the strap 32 engages the periphery of the hub 21, the pin 51 projecting into one of the apertures 29. The intermediate strap member 40 is positioned on the left hand side of the nut 18, as shown in Fig. 4, the inner surface 41 of the member 40 engaging the periphery of the nut, the pin 49 projecting into one of the apertures 30. The trunnion nut 48 is mounted on the member 40, the arms 46 and 47 being positioned respectively in the slots 44 and 45 in the extensions 42 and 43. The threads 39 on the bolt 38 are brought into engagement with the threads in the nut 48 and the bolt is turned in a direction to move the trunnion nut 48 on the threads 39 toward the head of the bolt. As the trunnion nut 48 moves along the bolt, the arms 46 and 47 thereon, which are in engagement with the slots 44 and 45, cause the member 40 to be rotated in a clockwise direction toward the straps 31 and 32, engagement of the pins 50 and 51 on said straps with the apertures 20 and 29 preventing movement of the straps 31 and 32 since the hubs 16 and 21 are secured respectively to the conduit and the return bend connection 13. The rotative movement of the member 40 causes the nut 18 to be rotated in a clockwise direction since the nut and the member are held against relative movement by engagement of the pin 49 with one of the apertures 30. Since the trunnion nut 48 is pivotally mounted on the member 40 and the trunnion 37 is pivotally mounted in relation to the straps 31 and 32, the bolt 38 is permitted movement on the axis of the trunnion 37 assuring a rotative movement of the member 40.

Figure 2:
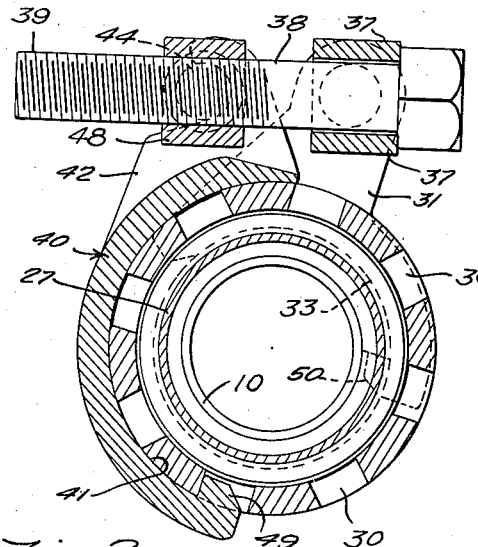
Fig. 2 is a transverse sectional view taken on the line 2—2 of Fig. 1.

If it is desired to turn the nut 18 in a counter-clockwise direction to loosen one of the joints, the position of the wrench on the joint is reversed to the position shown in Figs. 2 and 3, that is, the straps 31 and 32 are positioned on the left hand side of the hubs 16 and 21 and the intermediate strap member 40 is positioned on the right hand side of the nut 18. The bolt is then turned to draw the trunnion nut 48 toward the trunnion 37 thereby imparting a counter-clockwise movement to the member 40 and nut 18. The operation of the various parts of the wrench is similar to that previously described to impart a clockwise movement to the member 40.

It is understood that changes may be made in the form, location and relative arrangement of the parts of the device shown and described herein without departing from the principles of the invention, which is not to be limited excepting by the scope of the appended claims.

What is claimed is:

1. A wrench comprising spaced, substantially semi-circular shaped gripping members the concave surface of each of which is adapted to engage the periphery of one of the opposed annular members of a joint on one side of the axis of the joint, which joint comprises adjacently opposed annular members fixed against rotative movement and adapted to be joined by a rotatable annular member, means for holding the gripping members against movement in relation to the fixed annular members, spacing means positioned between the gripping members and pivotally mounted in relation thereto to pivot on an axis substantially parallel to the axis of said joint, another substantially semi-circular shaped gripping member adapted to be disposed intermediate the spaced gripping members, the concave surface of said other gripping member being adapted to engage the periphery of the rotatable member of the joint at the side of the axis of the joint substantially opposite to that engaged by the spaced gripping members, means for holding said other gripping member and the movable annular member against relative movement, actuated means for said other gripping member comprising a nut removably mounted thereon to pivot on an axis substantially parallel to the axis of rotation of said other gripping member and having a screw-threaded aperture extending therein transversely of the axis of rotation of said member, and actuating means comprising a bolt rotatably mounted in the spacing means to extend transversely of the axis of rotation of said means, the screw-threads on which are adapted to engage the screw-threads in the actuated means, the arrangement being such that turning of the bolt in one direction will cause said other gripping member and the rotatable annular member to be rotated in a direction toward the spaced gripping members.

2. A wrench comprising spaced, substantially semi-circular shaped gripping members the concave surface of each of which is adapted to engage the periphery of one of the opposed annular members of a joint on one side of the axis of the joint, which joint comprises adjacently opposed annular members fixed against rotative movement and adapted to be joined by a rotatable annular member, means for holding the gripping members against movement in relation to the fixed annular members, spacing means positioned between the gripping members and pivotally mounted in relation thereto to pivot on an axis substantially parallel to the axis of said joint, another substantially semi-circular shaped gripping member adapted to be disposed intermediate the spaced gripping members, the concave surface of said other gripping member being adapted to engage the periphery of the rotatable member of the joint at the side of the axis of the joint substantially opposite to that engaged by the spaced gripping members, means for holding said other gripping member and the movable annular member against relative movement, actuated means for said other gripping member comprising a nut mounted thereon to pivot on an axis substantially parallel to the axis of rotation of said other gripping member and having a screw-threaded aperture extending therein transversely of the axis of rotation of said member, and actuating means comprising a bolt rotatably mounted in the spacing means to extend transversely of the axis of rotation of said means, the screw-threads on which are adapted to engage the screw-threads in the actuated means, the arrangement being such that turning of the bolt in one direction will cause said other gripping member and the rotatable annular member to be rotated in a direction toward the spaced gripping members.

3. A wrench comprising spaced, substantially semi-circular shaped gripping members the concave surface of each of which is adapted to engage the periphery of one of the opposed annular members of a joint on one side of the axis of the joint, which joint comprises adjacently opposed annular members fixed against rotative movement and adapted to be joined by a rotatable annular member, the adjacently opposed annular members and the rotatable annular member each having a row of spaced apertures therein, a pin in each of the spaced gripping members projecting from the concave surface thereof and adapted to extend into one of the apertures of said opposed annular members to hold the gripping members against movement in relation to said opposed annular members, spacing means positioned between the gripping members and pivotally mounted in relation thereto to pivot on an axis substantially parallel to the axis of said joint, another substantially semi-circular shaped gripping member adapted to be disposed intermediate the spaced gripping members, the concave surface of said other gripping member being adapted to engage the periphery of the rotatable member of the joint at the side of the axis of the joint substantially opposite to that engaged by the spaced gripping members, a pin in said other gripping member projecting from the concave surface thereof and adapted to extend into one of the apertures of said rotatable annular member to hold said other gripping member against movement in relation to said other annular member, actuated means for said other gripping member comprising a nut mounted thereon to pivot on an axis substantially parallel to the axis of rotation of said member, and actuating means comprising a bolt rotatably mounted in the spacing means to extend transversely of the axis of rotation of said means, the screw-threads on which are adapted to engage the screw-threads in the actuated means, the arrangement being such that turning of the bolt in one direction will cause said other gripping member and the rotatable annular member to be rotated in a direction toward the spaced gripping members.

4. A wrench comprising spaced gripping members each having a curved surface for engagement with an annular member of a joint comprising adjacently opposed, annular members adapted to be joined by a rotatable annular member, means for holding the gripping members and said adjacently opposed annular members against relative movement, spacing means positioned between the gripping members and pivotally mounted in relation thereto to pivot on an axis substantially parallel to the axis of said opposed annular members, another gripping member adapted to be disposed intermediate the spaced gripping members and having a curved surface for engagement with the rotatable annular member of the joint, means for holding said other gripping member and the movable annular member of the joint against relative movement, actuated means for said other gripping member comprising a nut mounted therein to pivot on an axis substantially parallel to the axis of rotation of said other gripping member and having a screw-threaded aperture extending therethrough transversely of the axis of rotation thereof, and actuating means comprising a bolt rotatably mounted in the spacing means to extend transversely of the axis of rotation of said means, the screw-threads on which are adapted to engage the screw-threads in the actuated means, the arrangement being such that turning of the bolt will cause said other gripping member and the rotatable annular member to be rotated.

5. A wrench comprising spaced gripping means each having a surface adapted to engage one of the opposed members of a joint comprising adjacently opposed members adapted to be joined by a rotatable member, means for holding the gripping means against movement in relation to the opposed members, spacing means positioned between the gripping means and pivotally mounted in relation thereto to pivot on an axis substantially parallel to the axis of the rotatable member, intermediate gripping means adapted to be positioned between the spaced gripping means and to engage the rotatable member of the joint, means for holding the intermediate gripping means against movement in relation to said rotatable member of the joint, actuated means for the intermediate gripping means comprising a nut mounted thereon to pivot on an axis substantially parallel to the axis of the rotatable member of the joint and having a screw-threaded aperture extending therethrough transversely of the axis on which said nut pivots, and actuating means comprising a bolt rotatably mounted in the spacing means to extend transversely of the axis of rotation thereof, the screw-threads of which are adapted to engage the screw-threads in the actuated means, the arrangement being such that turning of the bolt will cause said intermediate gripping means and the rotatable member of the joint to be rotated.

6. A wrench comprising spaced gripping means each having a surface adapted to engage one of the opposed members of a joint comprising adjacently opposed members adapted to be joined by a rotatable member, means for holding the gripping means against movement in relation to the opposed members, spacing means positioned between the gripping means and pivotally mounted in relation thereto to pivot on an axis substantially parallel to the axis of the rotatable member, intermediate gripping means adapted to be positioned between the spaced gripping means and to engage the rotatable member of the joint, means for holding the intermediate gripping means against movement in relation to said rotatable member of the joint, actuated means for the intermediate gripping means pivotally mounted thereon to turn on an axis substantially parallel to the axis of the rotatable member of the joint, and actuating means rotatably mounted in the spacing means and adapted to engage said actuated means, the arrangement being such that turning of the actuating means will cause the actuated means to rotate the intermediate gripping means and the rotatable member of the joint.

7. A wrench comprising substantially semi-circular shaped gripping members spaced from one another along a longitudinal axis and extending at one side of said axis, an intermediate, substantially semi-circular shaped gripping member adapted to be disposed between the spaced gripping members and to extend on the opposite side of said axis, spacing means positioned between the gripping members and pivotally mounted in relation thereto to pivot on an axis substantially parallel to said longitudinal axis, actuated means for said intermediate gripping member pivotally mounted thereon to turn on an axis substantially parallel to said longitudinal axis, and actuating means rotatably mounted in the spacing means and adapted to engage the actuated means, the arrangement being such that turning of the actuating means in one direction will cause the actuated means to move the intermediate gripping means in a direction toward the spaced gripping means.

8. A wrench comprising substantially semi-circular shaped gripping members spaced from one another along a longitudinal axis and extending at one side of said axis, an intermediate substantially semi-circular shaped gripping member adapted to be disposed between the spaced gripping members and to extend on the opposite side of said axis, spacing means positioned between the gripping members and pivotally mounted in relation thereto to pivot on an axis substantially parallel to said longitudinal axis, actuated means for said intermediate gripping member comprising a nut mounted thereon to pivot on an axis substantially parallel to said longitudinal axis and having a screw-threaded aperture extending therein transversely of said axis, and actuating means comprising a bolt rotatably mounted in the spacing means to extend transversely of said longitudinal axis, the screw-threads on which are adapted to engage the screw-threads in the actuated means, the arrangement being such that turning of the bolt in one direction will cause said intermediate gripping member to be rotated in a direction toward the spaced gripping members.

STANFIELD N. ARNOLD.